United States Patent [19]

Lopata

[11] Patent Number: 4,641,017
[45] Date of Patent: Feb. 3, 1987

[54] FRAUD RESISTANT CREDIT CARD SYSTEM

[75] Inventor: Herman Lopata, 144 E. Kingsbridge Rd., Mount Vernon, N.Y. 10550

[73] Assignee: Herman Lopata, Mount Vernon, N.Y.

[21] Appl. No.: 561,638

[22] Filed: Dec. 15, 1983

[51] Int. Cl.⁴ .............................................. G06K 7/10
[52] U.S. Cl. ..................................... 235/457; 235/454
[58] Field of Search ................................ 235/454, 457

[56] References Cited

U.S. PATENT DOCUMENTS

| | | |
|---|---|---|
| 3,353,006 | 11/1967 | Pollock et al. |
| 3,564,214 | 2/1971 | Cooper, Jr. |
| 3,597,734 | 8/1971 | Harris, Jr. |
| 3,643,216 | 2/1972 | Greenaway et al. |
| 3,665,161 | 5/1972 | Oberhart |
| 3,735,374 | 5/1973 | Rembault |
| 3,753,249 | 8/1973 | Silverman ............................ 235/457 |
| 3,819,911 | 6/1974 | Greenaway |
| 3,859,508 | 1/1975 | Brosow et al. |
| 3,959,630 | 5/1976 | Hogberg |
| 4,143,810 | 3/1979 | Greenaway ......................... 235/457 |
| 4,211,918 | 7/1980 | Nyfeler .............................. 235/454 |
| 4,218,674 | 8/1980 | Brosow et al. |
| 4,376,887 | 3/1983 | Greenaway ......................... 235/457 |

Primary Examiner—Harold I. Pitts
Attorney, Agent, or Firm—Lee C. Robinson, Jr.

[57] ABSTRACT

A reflection hologram is laminated or otherwise incorporated into the face of a magnetic-stripe credit card or other similar document. This is done to guard against counterfeiting of the document by transfering of information from the magnetic stripe or similar indicia that is not readily detectable by an operator or user of the card or document. The card is verified by inserting it into a reading device which, while reading the information on the magnetic stripe or other indicia, also illuminates the hologram, producing holographic images or spots at one or more pedetermined unique angles, so that the spots can be detected by light sensing devices. Absence of a reflection at the proper angle would immediately indicate, through sensing circuitry, that the card is of questionable validity. To render the system still more secure, the hologram can produce multiple reflective images to be detected at several predetermined positions either from a single point or from multiple points.

6 Claims, 3 Drawing Figures

FRAUD RESISTANT CREDIT CARD SYSTEM

The present invention relates to security systems for credit cards or identification cards, and is particularly directed to a tamper-proof credit or identification card system including a reflection hologram incorporated into the face of the credit card or similar document, and an optical reader for verifying the authenticity of the credit card or other document by reconstructing and detecting a holographic image.

Identification cards, credit cards, and other similar documents often are constructed with a magnetic stripe, bar code, or other similar means containing information about the authorized bearer of the card. The information in the magnetic stripe or other code can be used for financial transactions and can facilitate, for example, a credit check on the authorized bearer. In addition, it is common to include a supplemental encrypted code corresponding to an authorized bearer's "secret number", which can be entered on a machine keyboard located, for example, at a secure building entrance point, a bank automatic teller, or other place where code verification is required.

Despite the degree of security provided by the encrypted "secret number" information a considerable amount of credit card fraud or unauthorized entry, or the like has occurred by persons who have stolen or surreptitiously "borrowed" the card from an authorized user, and copied the information from the magnetic stripe onto a blank card having a magnetic stripe. For that reason, it has been desired to provide an additional security means on the card or other document which cannot be simply copied, and thus, by virtue of its use will prevent or substantially hinder the occurrence of fraud or unauthorized copying.

In accordance with several preferred embodiments of this invention, a tamper proof credit or identification card is described herein, and comprises a flat card member adapted to identify the bearer thereof, and a reflective hologram disposed on one surface of the card member. The hologram is constructed such that a reference light beam impinging thereon from a light source at one predetermined angle and orientation to the surface of the card will produce a unique image at another predetermined angle relative to the reference beam to impinge on one or more sensor means disposed at a predetermined position relative to the light source. Preferably, this hologram is disposed on the card in addition to the magnetic stripe, bar code, or other identification means that is conventionally applied to the reverse of the card.

A verifying card reader mechanism for the card of this invention has a slot or similar means to receive one such card inserted therein, a magnetic head or equivalent means to read the data on the magnetic stripe, bar code, or the like when the card is inserted therein in a predetermined orientation, a reference light beam source disposed within the reader and positioned and oriented so that the light beam emanating therefrom impinges on the hologram at the proper predetermined angle, and at least one light sensor means disposed in the reader at the proper predetermined position to provide an output signal when a reconstructed holographic image impinges thereon. A checking circuit coupled to the output of this light sensor means can indicate the authenticity of the card inserted in the reader.

In one preferred embodiment, the hologram produces a single image at one predetermined angle relative to the reference or reconstruction beam, and the associated reader includes a single light sensor means disposed at the proper position to receive light from the holographic image when the card is inserted in the reader. In another preferred embodiment, the hologram is constructed to produce a plurality of holographic spots or images, each at its own predetermined angle relative to the reference or reconstruction beam. In this case, the reader includes at least that many optical sensors disposed at corresponding positions. Additional sensors can be used to detect whether a spot is occurring where darkness should be expected, thus providing additional verification power.

The above and many other objects, features, and advantages of this invention will become more apparent from the ensuing detailed description, when considered with the accompanying drawings, in which.

Figure 1:
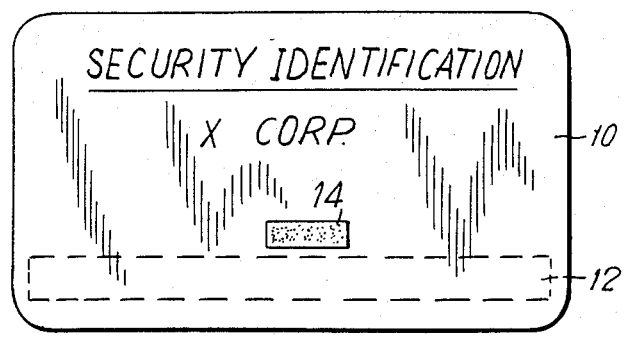
FIG. 1 is a plan view of a typical identification or credit card for use in the system of this invention.

With reference to the drawings, and initially to FIG. 1 thereof, a generally flat, laminated plastic credit card 10 is shown to illustrate the general characteristics of identification cards, credit cards, and other similar documents. This particular card 10 is of the familiar wallet size, and includes a magnetic stripe 12 on a reverse side thereof, and disposed at or slightly apart from one edge of the card. On the front surface of the card 10 is a reflection hologram 14 whose characteristics can be of the type shown, for example, in the FIG. 2 and FIG. 3 embodiments of the system of this invention.

Of course, instead of the magnetic stripe 12, or in addition thereto, the card can include a bar graph code, magnetic ink characters, or other indicia suitable for automatic reading to identify the authorized bearer of the card. Although not specifically shown here, a typical card 10 can also incorporate a picture of the bearer, the bearer's signature, a thumb print, or other conventional visual identification means.

Preferably, the hologram 14 is embossed into the card 10, so that it cannot be removed or altered without drastically affecting the appearance of the card 10.

Techniques for constructing holograms such as the hologram 14 are well known, and stampings, prints, or reproductions of holograms can be easily obtained using these conventional techniques. A suitable hologram having the characteristics described below can be easily produced using conventional techniques to be employed within the card 10.

Figure 2:
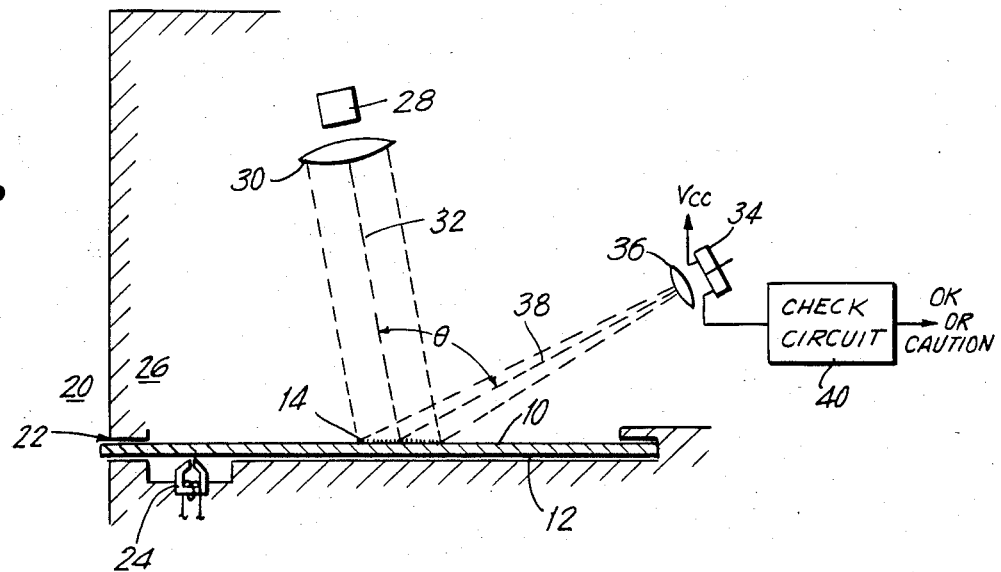
FIG. 2 illustrates the principle of operation of a first embodiment of this invention.

A first embodiment of a security identification system of this invention is shown in FIG. 2. In that embodiment, the card 10 is inserted into the reader device 20 through a slot 22 therein with the magnetic stripe 12 down so that a magnetic stripe reader head 24 picks up the data from the stripe 12 as the card is being inserted. The head 24 is coupled to a decoder (not shown) which can be of conventional and well known construction.

As the card is thus inserted into the interior 26 of the reader 20 with the stripe 12 downwards, the hologram 14 perforce is facing upwards. A light source 28, which can be an LED or a solid state laser, or can optionally be a simple light bulb, is disposed at a predetermined position within the interior 26 of the reader 20 and above the hologram 14. An optional converging lens 30 is shown disposed in front of the light source 28. The light source 28 produces a reconstruction hologram beam 32 which is incident on the hologram 14 at a predetermined angle relative to the front face of the card 10.

A photodetector 34, which can be a photo transistor, or can alternatively be a CdS element, photo diode, or the like, is disposed at another predetermined position within the reader 20, and is shown with an optional lens 36 disposed in front of it. A reflected holographic image beam 38 is produced by the hologram 14 from the beam 32 incident thereon. The reflected beam 38, in this embodiment, is a unique beam producing a spot at a unique, predetermined angle $\theta$ (e.g. 90°) relative to the incident reconstruction beam 32. It is at the location of the spot that the photodetector 34 is disposed.

A check circuit 40 is coupled to the photodetector 34 and produces a signal of a first sense (OK) if light is received at the detector 34 when the card is fully inserted, but produces an indication of an opposite sense (CAUTION) if no light is received by the photodetector 34 when the card 10 is fully inserted.

It can be seen that, with the security system of this invention, when the card 10 is verified or read, the absence of a reflection at the proper angle would immediately indicate that the card is of questionable validity, and that manual security intervention is necessary. However, the presence of the spot of light at the single holographic point provides a strong security measure, and, for most purposes, makes manual intervention unnecessary so long as the check circuit 40 produces the proper signal (OK).

While the magnetic stripe 12, bar graph code, or other indicia can be easily reproduced by perpetrators of identification card or credit card fraud the hologram 14 cannot be so reproduced, thus rendering the card relatively tamper proof and fraud resistant.

Figure 3:
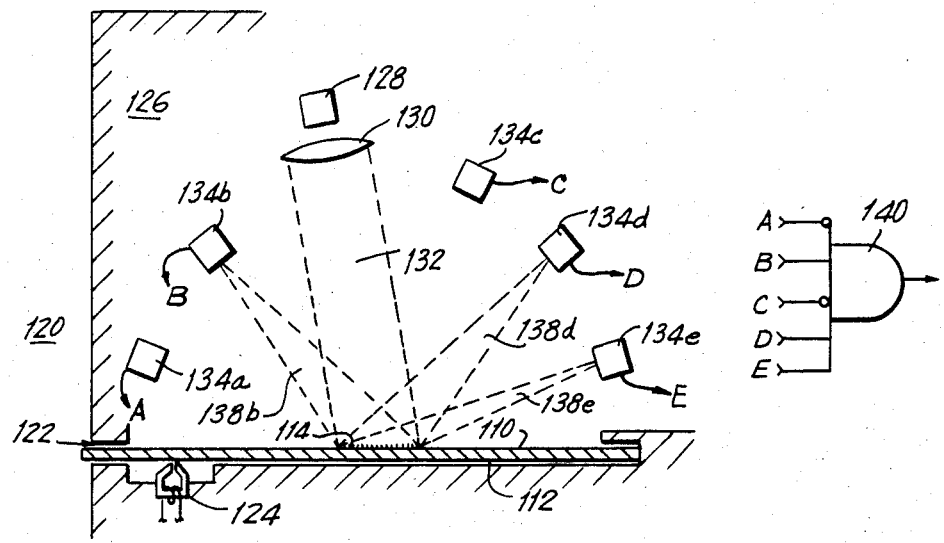
FIG. 3 illustrates the principle of operation of a second embodiment of this invention.

Another embodiment of this invention is shown in FIG. 3.

Elements of the FIG. 3 embodiment that correspond to those in the FIG. 1 embodiment are identified with similar reference numerals, but raised by 100.

In this embodiment, the card 110 has a multiple image hologram 114 disposed on the front face thereof. Here, the hologram 114 produces three discrete images or spots at respective predetermined angles relative to the incident reconstruction beam 132.

A light source 128, which can include a lens 130, generates the reference or reconstruction beam 132 at the proper predetermined angle to be incident onto the hologram 114. A plurality of photodetectors 134a, 134b, 134c, 134d, and 134e are disposed within the interior 126 of the card reader 120 at predetermined points therein, and at least some of these are disposed at positions that correspond to the holographic image spots of the hologram 114. Here, for the single reference beam 132 incident onto the hologram 114, three reconstructed image beams 138b, 138d, and 138e are produced at first, second, and third predetermined angles relative to the reference beam 132. These beams create spots of light at points corresponding to the positions of the photodetectors 134b, 134d, and 134e. It should be noted that there are no reflected beams (which would be identified, if they existed, as 138a and 138c) incident onto the photodetectors 134a and 134c. Thus, when the card 110 is inserted into the reader 120, the photodetectors 134a and 134c are dark, while the remaining photodetectors 134b, 134d, and 134e are lit.

These photodetectors 134a–134e have respective outputs A, B, C, D, and E which are coupled to corresponding inputs A to E of a five-input AND gate 140. In this gate 140, inputs A and C are inverted. Consequently, the output of the gate 140 will be high if inputs B, D, and E, are high, and inputs A and C are low, but the output will be low otherwise.

This arrangement permits still more accurate and more secure detection of possible fraud or unauthorized copying of the card 110. Of course, the arrangement including the photodetectors 134a and 134c prevents the defeat of the security system which might otherwise be possible, for example, by flooding all five photodetectors with a flashlight or other device held at the slot 122.

While not specifically shown in these embodiments, threshold and amplifier circuits, or the like, would be incorporated with the photodetectors 34 and 134a–134e.

Also, while a specific logic circuit 140 has been shown in the FIG. 3 embodiment, it is to be understood that many other possible logic circuits could be employed to advantage.

With the fraud resistant identification and/or credit card system of this invention, manual verification by a human operator through visual inspection of the card is unnecessary unless the system discovers that fraud should be suspected. Consequently, manual verification is necessary only as an adjunct to electronic verification.

While certain preferred embodiments have been described hereinabove with reference to the drawings, it is to be understood that many modification and variations thereof will become apparent to those of ordinary skill without departure from the scope and spirit of this invention, as defined in the appended claims.

I claim:

1. Tamper proof credit or identification card, comprising a flat card member adapted to identify an authorized bearer thereof, automatically-readable indicia on one surface of the flat card member containing data relating to the authorized bearer, and a separate reflective hologram disposed on a surface of the flat card member, the automatically-readable indicia being spaced apart from the hologram, the hologram being so constructed that a reference light beam impinging thereon from light source means at one predetermined angle and orientation to said one surface of the card will produce an image at another predetermined angle relative to said reference beam to impinge on sensor means disposed at a predetermined position relative to said light source means.

2. Tamper proof credit or identification card as in claim 1, wherein said indicia one embodied as a magnetic stripe and the magnetic stripe and said reflective hologram are disposed on opposite flat surfaces of the card member.

3. Tamper proof credit or identification card, comprising a flat card member adapted to identify an authorized bearer thereof, automatically-readable indicia on one surface of the flat card member containing data relating to the authorized bearer, and a separate reflective hologram disposed on a surface of the flat card member, the automatically-readable indicia being spaced apart from the hologram, the hologram being so constructed that a reference light beam impining thereon from light source means at one predetermined angle and orientation to said one surface of the card will produce a plurality of images at predetermined angles relative to said reference beam, each to impinge on respective sensor elements disposed at predetermined positions relative to said light source means.

4. System for verifying authenticity of credit or identification cards, comprising one or more tamper proof cards, each including a flat card member adapted to identify the bearer thereof, automatically-readable indicia on one surface of the flat card member containing data relating to the authorized bearer, and a separate reflective hologram disposed on a surface of the flat card member, the automatically-readable indicia being spaced apart from the hologram, the hologram being so constructed that a reference light beam impinging thereon from light source means at one predetermined angle and orientation to said one surface of the card will produce an image at a predetermined angle relative to said reference beam to impinge on sensor means disposed at a predetermined position relative to said light source means; and a vertifying card reader mechanism including means to receive one such card inserted therein, means to read the data in said indicia when said card is inserted in a predetermined orientation, reference light beam source means disposed within said reader and positioned and oriented so that a light beam emanating therefrom impinges on said hologram at said one predetermined angle, at least one light sensor means disposed in said reader at said predetermined position and providing an output signal when said image impinges thereon, and checking circuit means coupled to receive the output of said sensor means to indicate the authenticity of the card inserted in said reader.

5. System for vertifying authenticity of credit or identification cards, comprising one or more tamper proof cards, each including a flat card member adapted to identify the bearer thereof, automatically-readable indicia on one surface of the flat card member containing data relating to the authorized bearer, and a separate reflective hologram disposed on a surface of the flat card member, the automatically-readable indicia being spaced apart from the hologram, the hologram being so constructed that a reference light beam impinging thereon from a light source means at one predetermined angle and orientation to said one surface of the card will produce a plurality of images at predetermined angles relative to said reference beam to impinge on respective sensor elements disposed at predetermined positions relative to said light source meams; and a verifying card reader mechanism including means to receive one such card inserted therein, means to read the data in said indicia when said card is inserted in a predetermined orientation, reference light beam source means disposed within said reader and positioned and oriented so that a ligth beam emanating therefrom impinges on said hologram at said one predetermined angle, a plurality of light sensor elements disposed at least at said predetermined positions relative to said light source means, each providing an output signal when said image impinges thereon, and checking circuit means coupled to receive the output of said sensor elements to indicate the authenticity of the card inserted in said reader.

6. System as in claim 5, wherein, in said reader mechanism, there are a first plurality of said light sensor elements each at a position corresponding to the position of a respective one of said images, and second plurality of additional light sensor elements disposed at other positions at which no image beam impinges, and said checking circuit includes logic circuit means having first and second sets of input coupled respectively to the outputs of the first and second plurality of sensor elements, and providing an output of an affirmative sense when the outputs of the first plurality of said elements are all of one predetermined sense, while the outputs of the second plurality of said elements are all of a complementary sense, and providing an output of another, negative sense otherwise.

* * * * *